United States Patent
Trim et al.

(10) Patent No.: US 11,501,241 B2
(45) Date of Patent: Nov. 15, 2022

(54) SYSTEM AND METHOD FOR ANALYSIS OF WORKPLACE CHURN AND REPLACEMENT

(71) Applicant: International Business Machines Corporation, Armonk, NY (US)

(72) Inventors: Craig M. Trim, Ventura, CA (US); Mary Rudden, Denver, CO (US); Leo Kluger, Spring Valley, NY (US); Aman Buttan, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 16/918,025

(22) Filed: Jul. 1, 2020

(65) Prior Publication Data

US 2022/0004967 A1    Jan. 6, 2022

(51) Int. Cl.
*G06Q 10/06* (2012.01)
*G06N 3/04* (2006.01)
(Continued)

(52) U.S. Cl.
CPC ......... *G06Q 10/06398* (2013.01); *G06F 8/77* (2013.01); *G06N 3/0427* (2013.01); *G06N 20/10* (2019.01)

(58) Field of Classification Search
CPC .............................. G06Q 10/06; G06N 20/10
(Continued)

(56) References Cited

U.S. PATENT DOCUMENTS 6,952,688 B1 * 10/2005 Goldman ............... G06N 5/022
                                                                706/45
8,719,179 B2    5/2014 Bonmassar et al.
(Continued)

FOREIGN PATENT DOCUMENTS

CN    110019843 A    7/2019
JP    2004312313 A    11/2004
(Continued)

OTHER PUBLICATIONS

Dadzie et al. "Structuring visual exploratory analysis of skill demand", Journal of Web Semantics: Science, Services and Agents on the World Wide Web 49 (2018): 51-70.
(Continued)

*Primary Examiner* — Nga B Nguyen
(74) *Attorney, Agent, or Firm* — Garg Law Firm, PLLC; Rakesh Garg; Michael O'Keefe

(57) ABSTRACT

A method of analyzing one or more asset repositories to determine a developer's competency and ability to collaborate in a team environment. The method includes obtaining metadata artifacts as documents from one or more asset repositories. The documents are represented using a tree structure that has nodes to form a knowledge graph that is suitable for input vectorization. Each node is configured in the tree structure to represent a content region within the one or more documents, with a root node representing the entire document and each node representing an aggregation of all its children nodes. One or more computing devices are used to receive an input vector that includes a set of descriptive statistics about data in asset repositories and a vectorized form of one or more concepts. The developer's competency and ability to collaborate in a team environment is automatically estimated using output values of a trained neural network.

20 Claims, 12 Drawing Sheets

(51) Int. Cl.
*G06F 8/77* (2018.01)
*G06N 20/10* (2019.01)

(58) Field of Classification Search
USPC ...................................................... 705/7.42
See application file for complete search history.

(56) References Cited

U.S. PATENT DOCUMENTS

| | | | |
|---|---|---|---|
| 8,914,391 B2 | 12/2014 | Iwama et al. | |
| 10,216,397 B2 | 2/2019 | McConnell | |
| 11,205,236 B1* | 12/2021 | Smith | G06Q 30/0631 |
| 2006/0041661 A1 | 2/2006 | Erikson et al. | |
| 2006/0064415 A1* | 3/2006 | Guyon | G06N 20/00 |
| 2008/0097938 A1* | 4/2008 | Guyon | G16B 40/30 706/12 |
| 2008/0275829 A1 | 11/2008 | Stull et al. | |
| 2009/0012842 A1* | 1/2009 | Srinivasan | G06F 40/30 705/12 |
| 2009/0157572 A1* | 6/2009 | Chidlovskii | G06N 20/00 706/12 |
| 2010/0274815 A1 | 10/2010 | Vanasco | |
| 2012/0197809 A1 | 8/2012 | Earl et al. | |
| 2013/0096944 A1 | 4/2013 | Shah et al. | |
| 2016/0335600 A1 | 11/2016 | Jain et al. | |
| 2017/0140262 A1 | 5/2017 | Wilson et al. | |
| 2018/0196867 A1 | 7/2018 | Wiesmaier et al. | |
| 2018/0260445 A1 | 9/2018 | Aravamudan et al. | |
| 2018/0373701 A1* | 12/2018 | McAteer | G06F 16/9024 |
| 2019/0065976 A1* | 2/2019 | Murray | G06N 5/022 |
| 2019/0286086 A1* | 9/2019 | Gardner | G16H 20/60 |
| 2020/0234129 A1* | 7/2020 | Fagerholm | G06N 3/082 |
| 2020/0327432 A1* | 10/2020 | Doebelin | G06N 5/02 |
| 2021/0073340 A1* | 3/2021 | Agarwal | G06V 30/412 |
| 2021/0232626 A1* | 7/2021 | Santry | G06K 9/6274 |
| 2021/0342634 A1* | 11/2021 | Chen | G06N 3/08 |
| 2021/0342674 A1* | 11/2021 | Santry | G06V 10/776 |
| 2021/0383067 A1* | 12/2021 | Reisswig | G06F 16/367 |
| 2021/0389491 A1* | 12/2021 | Maucec | G06N 3/0454 |

FOREIGN PATENT DOCUMENTS

| | | |
|---|---|---|
| JP | 5745932 B2 | 7/2015 |
| WO | 2020003325 A1 | 1/2020 |

OTHER PUBLICATIONS

Luo et al. "Macau: Large-scale skill sense disambiguation in the online recruitment domain", 2015 IEEE International Conference on Big Data (Big Data). IEEE, 2015.

Zhang et al., "Cross-cultural reliability and validity of a scale to measure information technology capability", Journal of Technology Research 2 (2011): 1.

Kermis et al., "Professional Presence and Soft Skills: A Role for Accounting Education", Journal of Instructional Pedagogies 2 (2010).

Brocato et al., "Writing While Designing: Combining ECE Senior Design with an Existing Technical Writing Course", 2005 ASEE Southeast Section Conference, pp. 1-7.

* cited by examiner

*FIGURE 8*

|   | COMPLEXITY | CONCEPT<br>802 | CONNECTIVITY | NAME |
|---|---|---|---|---|
| 0 | 0.229170 | KUBERNETES | 1.899005 | CRAIG-TRIM<br>804 |
| 1 | 2.251736 | KUBERNETES | 0.387277 | XAVIER-VERGES |
| 2 | 3.559972 | NATURAL LANGUAGE PROCESSING | 0.772857 | CRAIG-TRIM |
| 3 | 0.967649 | NATURAL LANGUAGE PROCESSING | 0.694185 | XAVIER-VERGES |

| | COMPLEXITY | CONCEPT 1002 | CONNECTIVITY | MEAN-COMPLEXITY | MEAN-CONNECTIVITY | MEDIAN-COMPLEXITY | MEDIAN-CONNECTIVITY | STDEV-COMPLEXITY | STDEV-CONNECTIVITY |
|---|---|---|---|---|---|---|---|---|---|
| 0 | 0.229170 | 0799330903 | 1.899005 | 0.275004 1004 | 1.519204 | 2.183856 | 1.785065 | 0.350630 | 2.506687 1006 |
| 1 | 2.251736 | 0799330903 | 0.387277 | 2.702083 | 0.309822 | 0.445369 | 0.364040 | 3.445156 | 0.511206 |
| 2 | 3.559972 | 7926388745 | 0.772857 | 4.271966 | 0.618286 | 0.888786 | 0.726486 | 5.446757 | 1.020171 |
| 3 | 0.967649 | 7926388745 | 0.694185 | 1.161179 | 0.555348 | 0.798313 | 0.652534 | 1.480503 | 0.916324 |

1000

SYSTEM AND METHOD FOR ANALYSIS OF WORKPLACE CHURN AND REPLACEMENT

BACKGROUND

Organizations usually have access to data about their employees in a myriad forms. These include work hours, performance evaluations, past projects, Curriculum Vitaes (CVs), certifications, badges, learning etc. This data is usually captured automatically and stored on internal servers. However, organizations usually do not leverage this data for other purposes. Moreover, employing or backfilling software developers is a difficult task.

Many traditional recruiting steps are based on reviewing resumes. This usually does not identify individuals who are the right fit and have expertise in specific Software languages as well as the passion and ingenuity to solve specific problems as education alone is not adequate to determine actual talent.

Recruiters and employers usually try to get an indication of whether an individual or current employee is a good fit for a new position based on anecdotal evidence such as reviews or personal accounts. Recruiters can obtain a candidate's past reviews for decision making even though the review can include subjective analysis of performance that could be inaccurate. Likewise, current employees of an organization can be re-assigned to new positions based on a subjective analysis of their strengths. It would be beneficial to have empirical evidence to back the analysis.

BRIEF SUMMARY

The illustrative embodiments provide a method, computer program product and computer system. An embodiment includes a method of analyzing one or more asset repositories to determine a developer's complexity and connectivity for one or more concepts. The method includes obtaining metadata artifacts as one or more documents from one or more asset repositories. The one or more documents are represented using a tree structure having nodes to form a knowledge graph that is suitable for input vectorization. Each node is configured in the tree structure to represent a content region within the one or more documents, with a root node representing the entire document and said each node representing an aggregation of all its children nodes. One or more computing devices are used to receive an input vector comprising a set of descriptive statistics about data in the one or more asset repositories and a vectorized form of the one or more concepts, said input vector being based on the knowledge graph, and the developer's complexity and connectivity for each of the one or more concepts is automatically estimated using output values of a trained neural network, wherein the output values are obtained based on the set of descriptive statistics about data in the one or more asset repositories and the vectorized form of the one or more concepts. Moreover, the developer's complexity and connectivity for each of the one or more concepts are estimated based on resulting Euclidean distance calculations, of the one or more concepts within the vector space. In an embodiment, the metadata artifacts include commits, issues, pull requests and file changes. Further, triples of nodes from the tree structure are obtained, to form positional information for sequentializing the nodes of the tree structure from left to right, wherein the triples of nodes include a root node and neighboring sibling nodes. The triples of nodes include a user node, a skill node or a semantic delegation construct. Further, the one or more concepts include an extracted role, skill or activity in the one or more asset repositories.

An embodiment includes a method for training a neural network to estimate a developer's complexity and connectivity for one or more concepts. The method includes receiving, by one or more computing devices, training data associated with a neural network model. The neural network model including a plurality of layers and at least one layer of the plurality of layers of the neural network model is trained using the training data to generate processed training data. The processed data includes output values corresponding to an estimate of a developer's complexity and connectivity for one or more concepts. The training of the at least one layer includes adjusting one or more weights of the at least one layer using the training data and the training data includes a set of descriptive statistics about data in one or more asset repositories and a vectorized form of the one or more concepts.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 illustrates a model output 800 in accordance with one embodiment.

FIG. 10 illustrates a table in which illustrative embodiments may be implemented;

DETAILED DESCRIPTION

Figure 1:
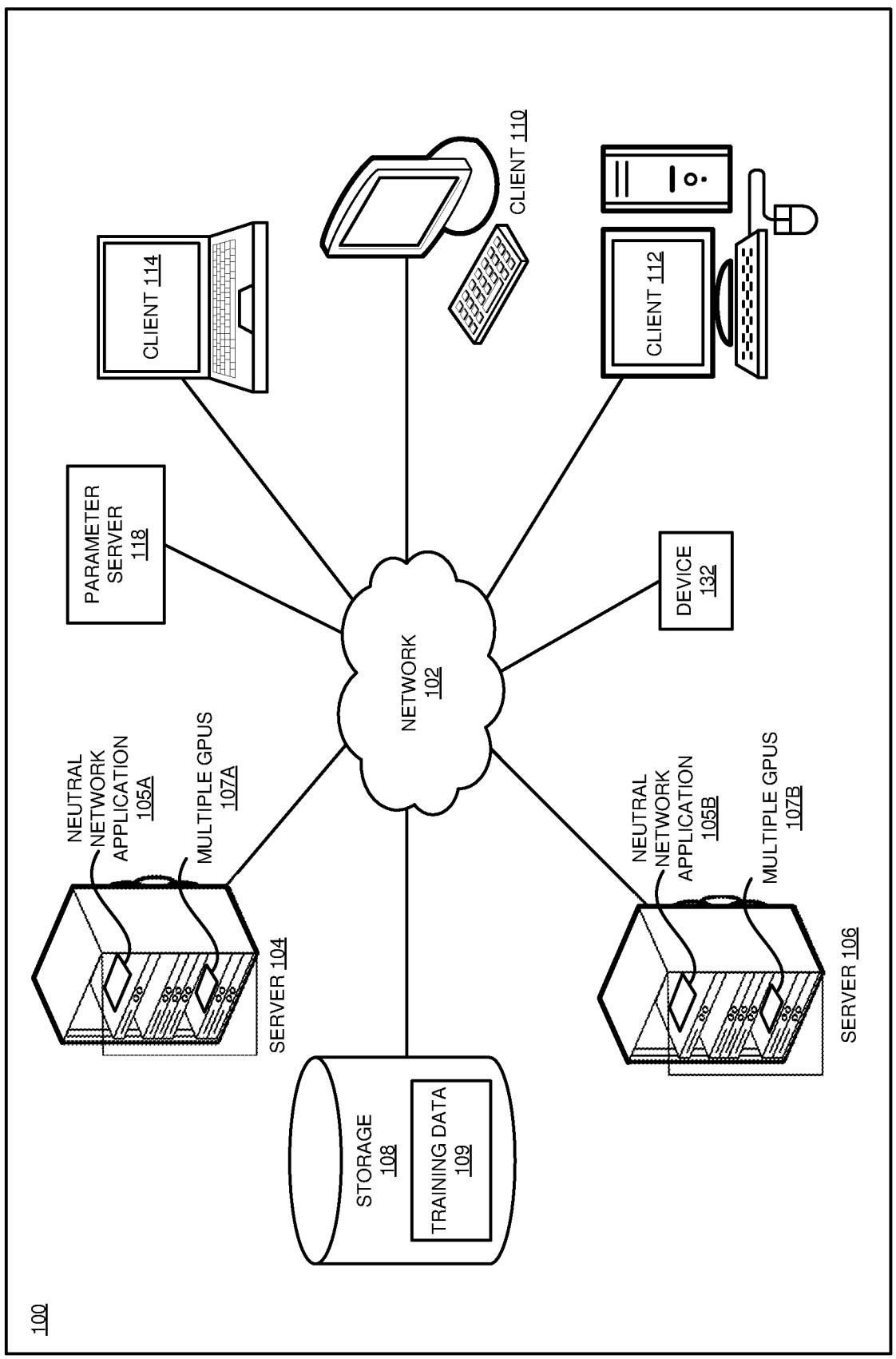
FIG. 1 illustrates a block diagram of a data processing system in which illustrative embodiments may be implemented.

The illustrative embodiments recognize that there is a need to analyze asset repositories and human resources (HR) data (CVs, badges, certifications, learning, etc) to perform skill extraction and determine the application of the skill as well as the behavioral patterns involved. For example, an Artificial Intelligence (AI)-driven system and method is used to analyze a person's skill complexity (which can generally be conceptually regarded as a normally distributed curve, where the mean represents average skill) and connectivity (ability to collaborate with other members of a team in a work environment) in order to rapidly backfill due to churn and attrition of a team.

An asset repository is generally referred to as central location for sharing Business Process Management (BPM) assets such as processes, software requirements, designs, models, source code, data, tests, user interfaces, user biographical information, and documentation that work together to solve a specific business problem. Assets can also include other assets.

Assets are created using development tools and placed into the asset repository to be reused by the creator or by others. Any changes to these assets are tracked and notifications are generated when changes are made to the assets. Reusing assets from the asset repository saves time and effort since developers can search the asset repository for existing assets and use them without having to create them themselves.

Moreover, the asset repository lets authorized people make changes. For example, an outbound event definition for one monitor model might be used as an inbound event definition for another (which is how models communicate). If the event definition is in the asset repository, only certain people have the authority to modify it, so that it is less likely to be unexpectedly modified in a way that would break the other model. Yet still, collaborative software development asset repositories be used by various development roles: business analysts, architects, developers, and testers. To facilitate reuse, assets in the asset repository contain descriptive information that explains their purpose, use, and relation to other assets.

One aspect of the problems of existing methods of determining a developer's skill complexity and collaborativeness is that it is difficult to perform a pre-screening to identify talented candidates to fill a position. As a result, many companies waste enormous amounts of time trying to find qualified candidates to fill positions such as software development positions. Additionally, the difficulties in assessing the actual talent of a candidate means that companies sometimes end up with employees that cannot perform as expected.

An illustrative embodiment allows the application of employee HR data to asset repositories such as Github (A mark owned by GitHub, Inc. in the United States and in other countries). When this data is applied to GitHub, not only are the formality and complexity of software assets incorporated, but also work behaviors and patterns are incorporated, which can then, in turn, lead to soft skills inference. Such an analysis leads to making more informed employee position filling decisions.

The illustrative embodiments recognize that the presently available tools or solutions do not address these needs or provide adequate solutions for these needs. The illustrative embodiments used to describe the invention generally address and solve the above-described problems and other problems related to distinguishing an image of a three-dimensional object from an image of a two-dimensional rendering of an object.

An embodiment can be implemented as a software application. The application implementing an embodiment can be configured as a modification of an existing system that analyses the strengths of new hires, as a separate application that operates in conjunction with an existing system that analyses the strengths of new hires, a standalone application, or some combination thereof.

FIG. 1 depicts a block diagram of a network of data processing system in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store training data 109, such as image data, for training a neural network. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

In an embodiment, one or more of neural network application 105A of server 104 and neural network application 105B of server 106 implements an embodiment, such as but not limited to a deep learning neural network, as described herein. The example of a deep learning neural network is not intended to be limiting. From this disclosure, those of ordinary skill in the art will be able to conceive many other forms of neural network implementations where an embodiment can be adapted for a similar purpose, and the such other neural networks and adaptations are contemplated within the scope of the illustrative embodiments.

In a particular embodiment, the neural network is implemented using one of network application 105A and network application 105B within a single server. In another particular embodiment, the neural network is implemented using both neural network application 105A and neural network application 105B within a single server. Server 104 includes multiple GPUs 107A including multiple nodes in which each node may include one or more GPUs as described herein. Similarly, server 106 includes multiple GPUs 107B including multiple nodes in which each node may include one or more GPUs as described herein.

Parameter server 118 is an example of a parameter server as described herein. In one or more embodiments, parameter server 118 is configured to receive neural network model parameters from each GPU, aggregate the parameters, and provide updated parameters to each of the GPUs.

Device 132 is an example of a device described herein. For example, device 132 may send a request to server 104 to perform one or more data processing tasks by neural network applications 105A, 105B such as initiating training of the neural network. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
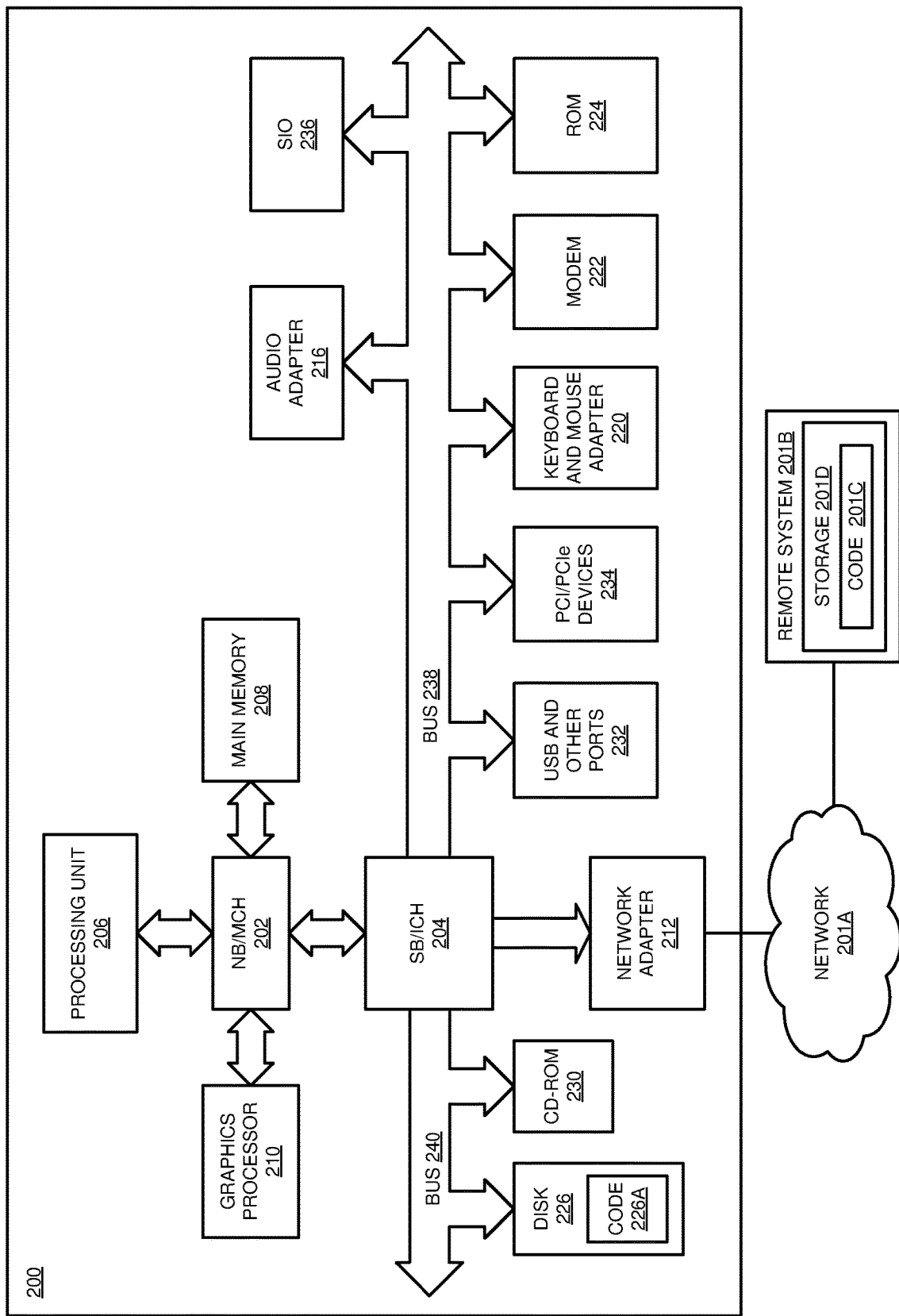
FIG. 2 illustrates block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
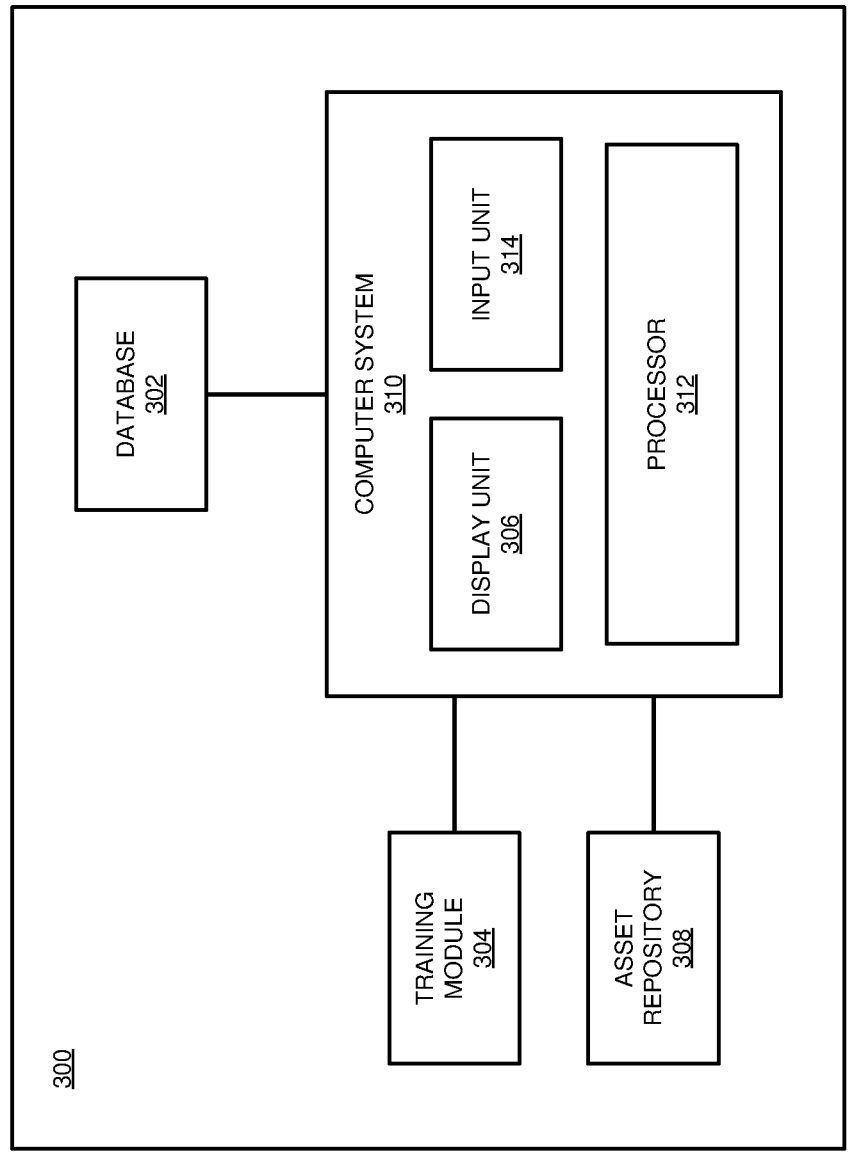
FIG. 3 illustrates a block diagram of a system in which illustrative embodiments may be implemented.

FIG. 3 shows a block diagram of a system 300 for analysis of workplace churn and replacement through the estimation of a person's skill complexity and ability to collaborate in a workplace environment. The system 300 includes an asset repository 308, a training module 304, a display unit 306, a computer system 310, a processor 312, and an input unit 314. The computer system 310 also includes at least one processor 312, and input unit 314. The processor 312 receives various requests and loads appropriate instructions, as stored on a storage device, into memory and then executes the loaded instructions. The system 300 can be a part of or separate from the data processing environment 100 of FIG. 1.

The computer system 310 receives registration requests from a device such as the input unit 314 and may load appropriate instructions for analyzing workplace churn and replacement. In one embodiment, the computer system 310 uses a plurality of training data sets from the database 302 (which includes a plurality of input vectors) to train one or more neural networks of training module 304.

In some embodiments, system 300 includes a neural network module (not shown) that contains various deep learning neural networks such as Convolutional Neural Networks (CNN), Fully Convolutional Neural Networks (FCN), Recurrent Neural Networks (RNN) and Recurrent Convolutional Neural Networks (Recurrent-CNN). The training data sets (inputs) to the neural networks are obtained from one or more asset repositories 308 and are pre-processed into one or more input vectors by creating a knowledge graph 600 of the one or more asset repositories 308 and obtaining from the knowledge graph 600 a set of descriptive statistics about data in the one or more asset repositories 308 as well as a vectorized form of the one or more concepts being analyzed, wherein a concept is an extracted role, skill, or activity found within the asset repository 308. The training module 304 uses the training data to supervise the learning process of the neural network as discussed hereinafter. The sizes of nodes in the knowledge graph 600 are a function of complexity as a combination of formal language processing and are used for weighting the input variables of the neural network. The neural network outputs values, for example two float values, representing complexity and connectivity and said output is visualized on the display unit 306.

Figure 4:
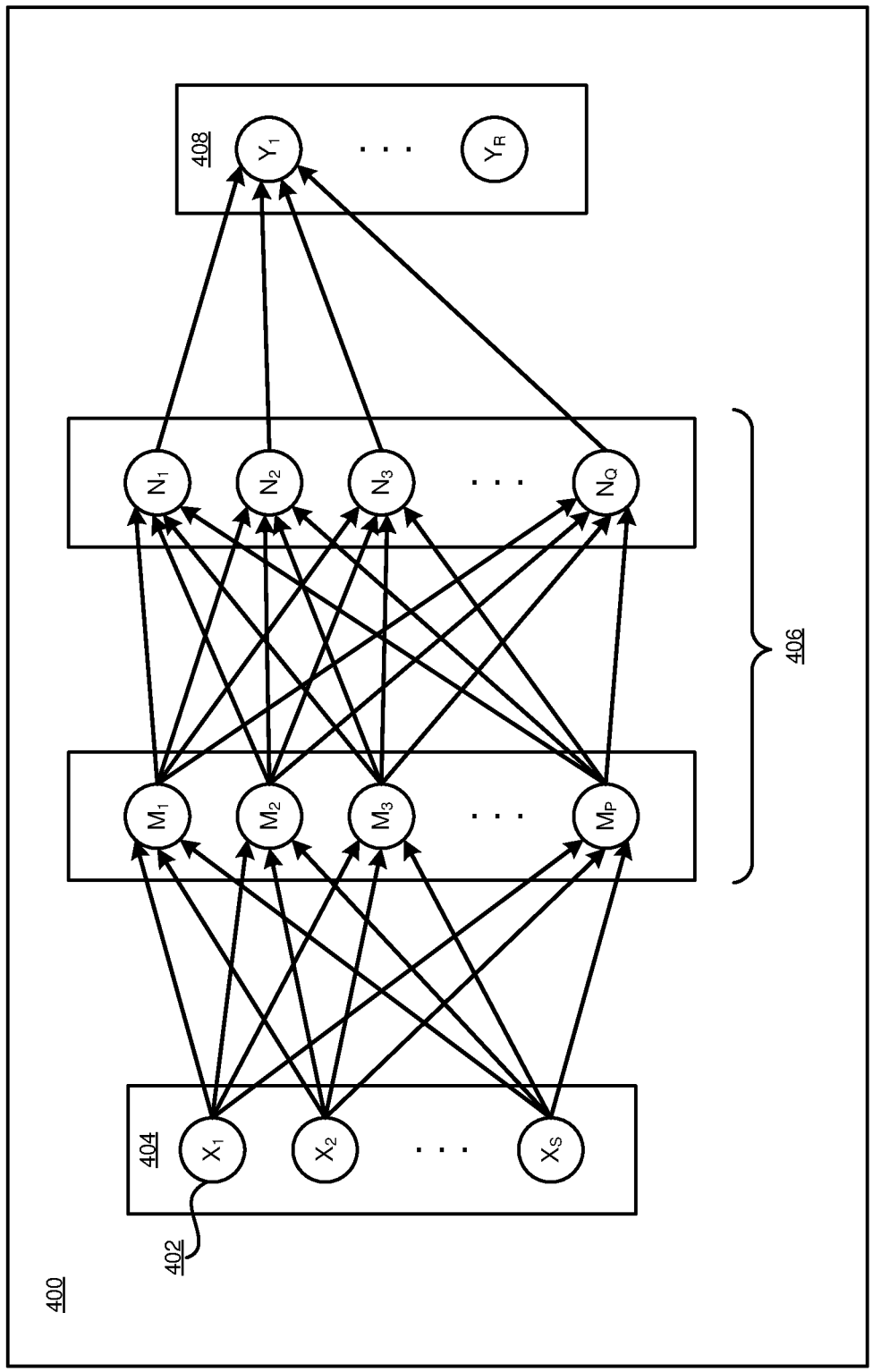
FIG. 4 illustrates a block diagram of a neural network in which illustrative embodiments may be implemented.

FIG. 4 shows a block diagram illustrating a structure of a neural network 400 in accordance with the illustrative embodiments. The neural network 400 has several layers including an input layer 404, one or more hidden layers 406 and an output layer 408. Each layer consists of one or more neurons 402 indicated by small circles. Information may flow from the input layer 404 to the output layer 408, i.e. left to right direction, although in other embodiments, it may be from right to left, or both. A neuron 402 has an input and an output and the neurons 402 of the input layer can be passive, meaning they do not modify the data. For example, the neuron 402 of the input layer 404 each receive a single value on their input and duplicate the value to their multiple outputs. Conversely, the neurons 402 of the hidden layers 406 and output layer 408 can be active, therefore being able to modify the data. In an example structure, each value from the input layer 404 is duplicated and sent to all of the neurons 402 of a hidden layer 406. The values entering the hidden nodes are multiplied by weights, which are a set of defined numbers associated with each of the neurons 402 of the hidden layer 406. The weighted inputs are then be summed to produce a single number. In an embodiment, the neural network 400 uses sizes of the nodes 602 of the knowledge graph 600 as one or more weights for layers of the neural network 400.

Figure 5:
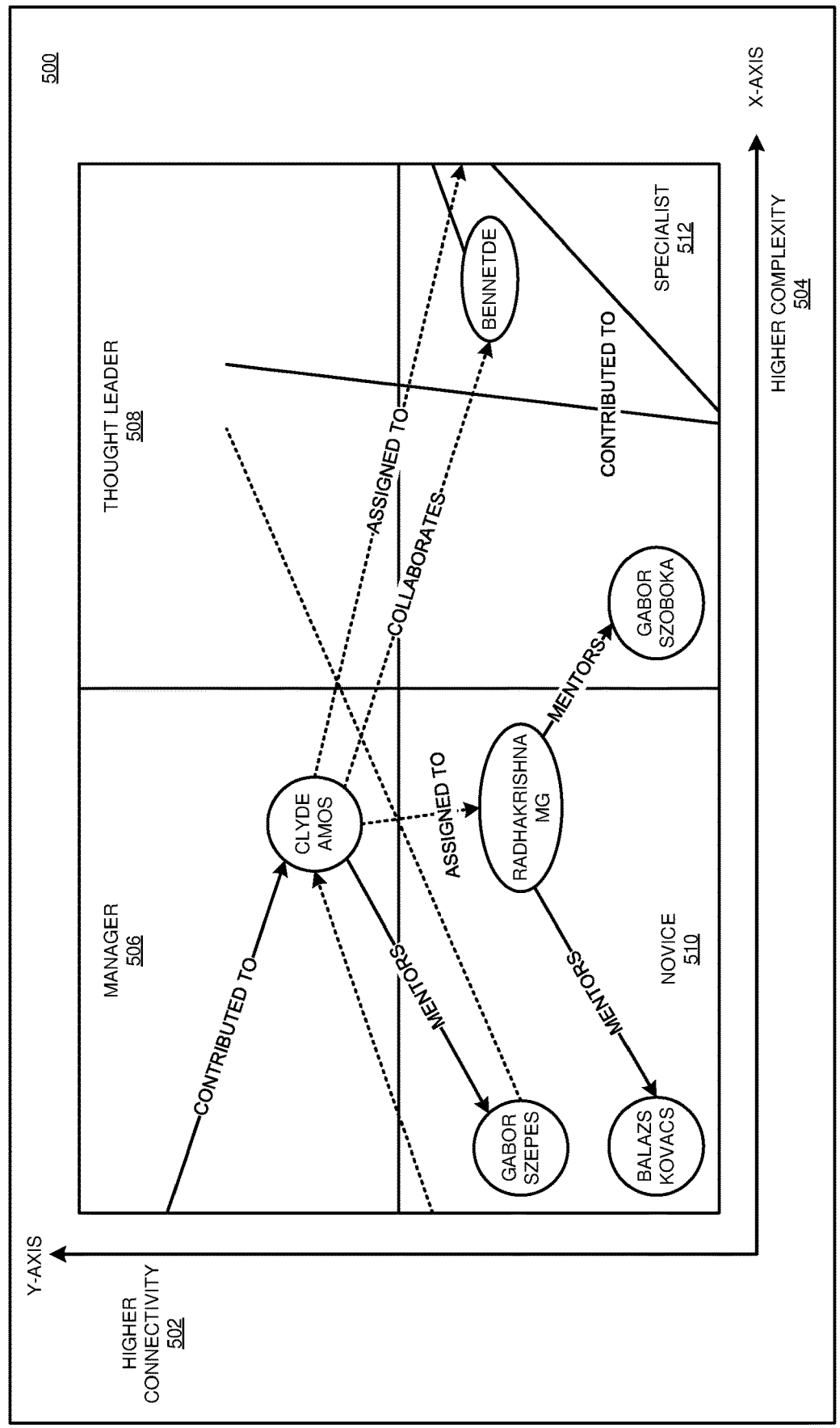
FIG. 5 illustrates a graph of a visualization in which illustrative embodiments may be implemented.

FIG. 5 illustrates a graph of a visualization in which illustrative embodiments may be implemented. The output values of the neural network 400 are two float values. These values can be visualized in many forms. In one exemplary embodiment, the output values are placed along a quadrant based spectrum 500, or represented within a distribution. In a further exemplary embodiment, the quadrant based spectrum 500 has a Y-axis representing increasing connectivity 502 and an X-axis representing increasing complexity 504. The quadrant based spectrum 500 also has four quadrants namely a low connectivity, low complexity quadrant 510 (representing a novice, for example), a high connectivity, low complexity quadrant 506 (representing a manager, for example), a low connectivity, high complexity quadrant 512 (representing a specialist, for example) and a high connectivity, high complexity quadrant 508 (representing a thought leader, for example).

Figure 6:
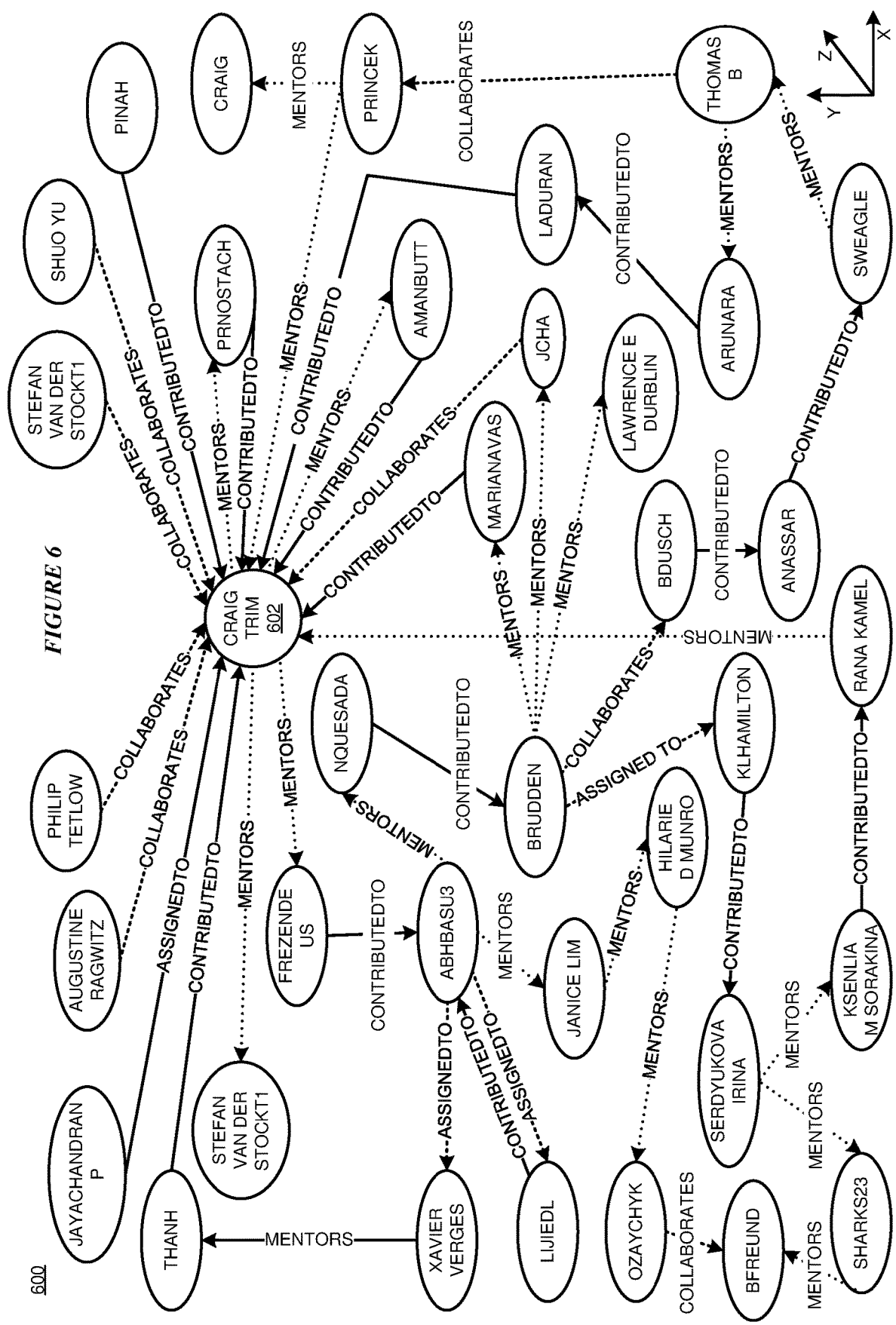
FIG. 6 illustrates a knowledge graph in which illustrative embodiments may be implemented.

Turning now to FIG. 6 which illustrates a knowledge graph 600 comprising nodes 602, said knowledge graph 600 adapted to be pre-processed to obtain inputs for the neural network 400, the method for analyzing employee churn and replacement is further described. In order to create the knowledge graph 600, repository artifacts are treated as documents and these documents are extracted from the asset repository 308. From the document sources, taxonomical data and triples (or quads) of nodes 602 are extracted. A triple is can be regarded as two nodes with an edge between them. A quad refers to key:value pairs associated along the edges. The knowledge graph can be visualized as a tree having several depth layers in the Z-direction. To segregate overlapping nodes in different depth layers requires the integration of local cues distributed over the knowledge graph 600 into a global percept. Thus, the known Hierarchical Markov Random Field (HMRF) model for information retrieval can be used. This model allows the generation of latent semantic relationships indicative of collaborative potential. One can assume the presence of dependencies between nodes that are associated with parent and child nodes within the knowledge base. Assuming that a dependency exists between nodes that are associated with neighboring sibling nodes at the same layer (in a plane that is parallel to the Y-axis as shown in FIG. 6) of the document tree, node dependency weighting can be formalized.

Semantic relationships indicative of collaborative constructs are minimally expressed as, for example, reports-to, collaborates (collaborate semantic relationship 702, FIG. 7), delegates-to. These relationships indicate (in order) that work is performed at the request of a colleague (not expressly as a manager as this could imply an integration request), or together with one-or-more colleagues jointly, or in a delegation pattern (inverse of the first construct). These constructs are under the same independence assumptions adopted within the latent concept expansion (LCE) model, which is a model based on HMRF that provides a mechanism for modeling term dependencies. In an exemplary embodiment, no edges are expressed between skills and collaboration explicitly, but the model does implicitly link these together. It is essential to use a representation that makes full use of the existing network within the asset repository 308 and preserves each repository artifact as a document. Commits, issues, pull requests, file changes, etc., are extracted from the asset repository 308, e.g. from GitHub. Every possible metadata artifact is obtained and treated as a document. It is to be noted that approaches that rely only on upper-level document representations would be too coarse-grained.

Initial weighting of collaboration concepts uses the following conditional probability of E given Q:

$$P(E|Q) \approx \frac{\sum_{S_{j-1}S_j,D} p(Q, E, S_{j-1}, S_j, D)}{\sum_{E}\sum_{S_{j-1}S_j,D} p(Q, E, S_{j-1}, S_j, D)}$$

wherein $\{S_{j-1}, S_j, D\}$ are triples of nodes 602 in the knowledge graph 600.

By parsing out this formal data, overlaying it with entities and relationships extracted in a Natural Language Understanding (NLU) pipeline, and loading into a knowledge graph 600, a representation that allows the exploration of co-occurrence at different spatial scales within each document can be obtained. Given the hierarchical structure of metadata within most asset repositories 308, the documents are represented using a tree structure. Each node 602 in the tree represents a content region within the material, with the root node representing the entire document. Each node is the aggregation of all its children nodes. All leaf nodes are basic content units and form a flat segmentation of the document.

For distribution weighting, adjacency analysis is used to determine which nodes $S_{j-1}$, and $S_j$, are associated with neighboring sibling nodes in the second layer of the document tree. D is the root node of the entire document, hence forming the object of the triple. This becomes a form of positional information that is used to sequentialize the nodes on the tree from left to right. The triples extracted from each document form a set and cover all the nodes of the document tree. They do not necessarily form a partition as it's more than likely a given node will appear within multiple triples. For example, a user node, or a skill node, or even a semantic delegation construct does not form a mutually exclusive usage. Ultimately this distribution is used to determine the weighting of the neurons 402 in the neural network 400 and this is used by the visualization. For example, the graph subset of FIG. 7 benefits by the aforementioned analysis by showing the overlap as a function of edge weighting; this illustrates collaboration over time in the repository.

FIG. 8 illustrates an exemplary model output 800 of the neural network 400 wherein two float output values (representing complexity and connectivity) for each concept are shown. The model output 800 has a concept column 802 and for each concept (e.g. role, skill, etc.) measures of a developer's 704 complexity and connectivity in relation to said concept are estimated by the neural network 400.

The concept column 802 is vast and refers to any extracted role, skill, or activity found within the repository.

Figure 9:
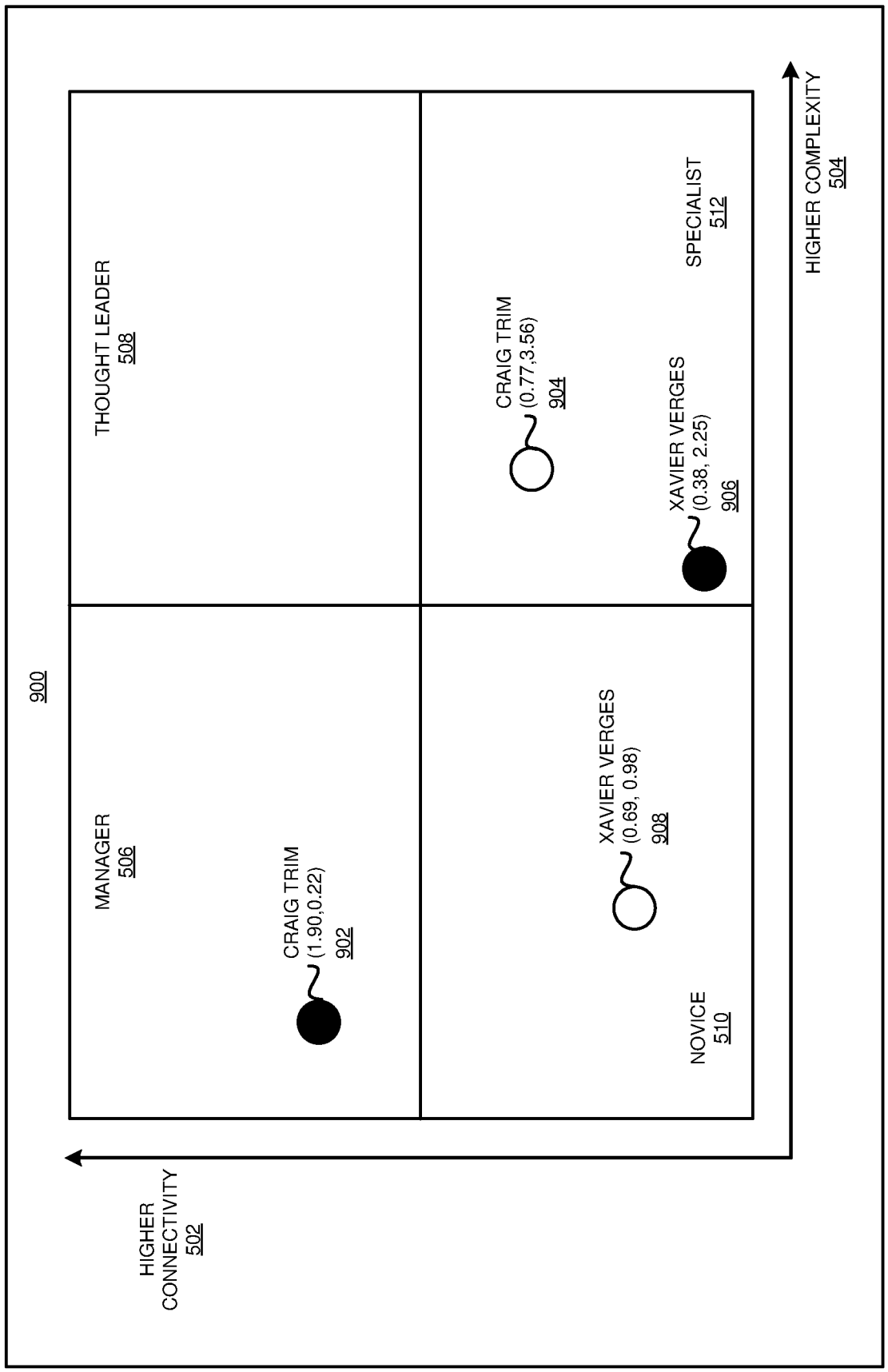
FIG. 9 illustrates a visualization in which illustrative embodiments may be implemented.

In an exemplary, embodiment, as shown in FIG. 8 and FIG. 9, an analysis is redacted to two concepts—Kubernetes (K8) and Natural Language Processing (NLP). It can be seen that Xavier performed most of the K8 work in isolation (906). He was the only member of the team who had this expertise, and so had little help to rely on. In Craig's case, his connectivity for K8 is relatively high, but complexity is relatively low (902), meaning he contributed very little of real value to the implementation.

In the case of NLP, both Xavier and Craig contributed substantial complexity (908, 904, with Craig contributing slightly higher) with almost equal connectivity. This is to be expected, as NLP is highly dependent upon understanding the domain and requires frequent collaboration. An analysis of this sort would be critical in performing an assessment form backfilling Craig. The formally listed roles may include Kubernetes and NLP. The actual roles include "Managing a K8 Installation" and "Performing an NLP Task (Expert Level)." Xavier's actual roles are "Performing a K8 Installation (Expert Level)" and "Performing an NLP Task (Average)".

The bucketing of expertise levels can be performed either relative to a talent distribution within the single repository or a cluster of repositories. This provides an effective baseline for measuring talent within a team, or across a department/organization.

The placement of the nodes in the quadrant in FIG. 9 imparts visual insights. Craig did not function as a thought leader within the context of this analysis for Natural Language Processing, as it only covered a single GitHub repository. Within the context of the team's contributions and discussions around this topic, Craig worked largely in isolation, with deep complexity. The same is generally true of Xavier's work with Kubernetes. The work was more isolated as no one else on the team was able to impart expertise. By comparing these concepts with others, it can be seen that Xavier does not consistently work with low connectivity, so the inference becomes clear.

Figure 7:
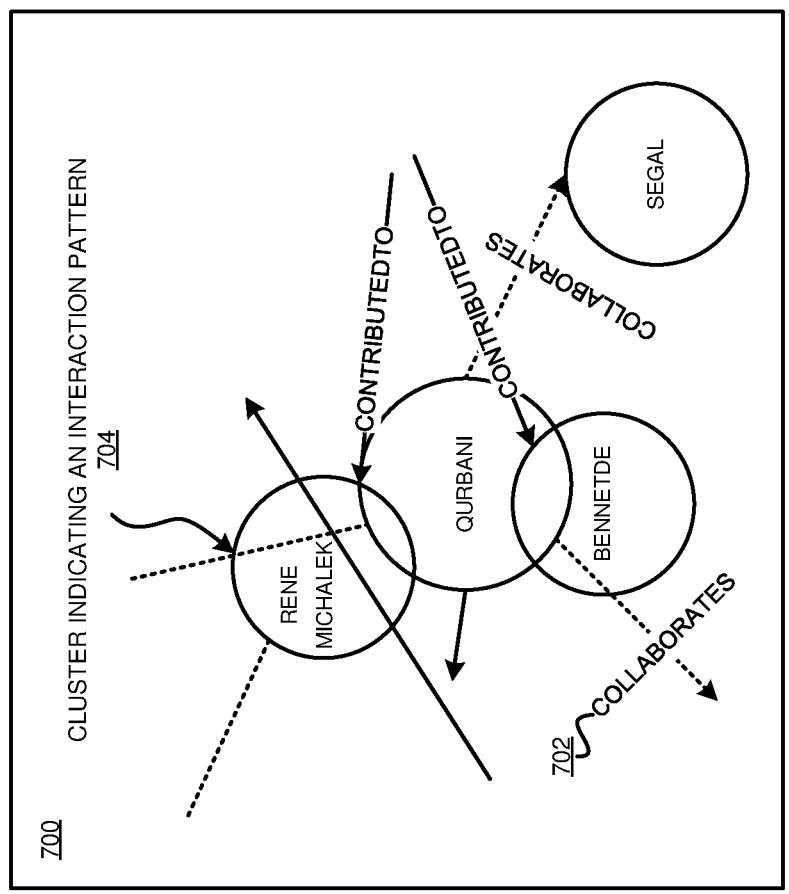
FIG. 7 illustrates a cluster indicating an interaction pattern in which illustrative embodiments may be implemented.

FIG. 10 illustrates a table containing an input vector for a neural network 400 to determine output values for connectivity and complexity according to an illustrative embodiment. The graph subset of FIG. 7 shows a size of each node 602 as a a function of complexity as a combination of formal language processing, including but not limited to (i) cyclomatic complexity (how complex is the underlying program that the GitHub files are focused on), (ii) function point counting (function point being a unit of measurement that expresses the amount of business functionality, aka utility/usefulness an information system provides to a user), (iii) Total Lines of Code, (T/LOC, used to measure the size of a computer program, i.e. a proxy for complexity), and (iv) GitHub or ZenHub (a project management tool that integrates natively within GitHub's user interface) metadata such as Epic points, file-commits, changed files, associated Pull Request and comments history (which are standard, countable/numeric, descriptive variables that GitHub creates and collects, that are associated with a given GitHub project).

The node size is used for weighting the input variables to the neural network 400. Formal language processing can be used to translate triples into numbers/vectors. The complexity weighting is computed with a regression wherein there is an initial step of using a regression to pre-process the data, to derive input weights for the complexity data.

An input vector of all weights is taken and a bucketing/grouping exercise is performed (typically a modified Likhert Complexity Scale, LCS, which is a five or seven point scale frequently used in surveys, thus some of the inputs to the regression are categorized or dimensionally reduced from a wide range of possible rational numbers, to a much smaller discrete set).

Over time, a statistical reinforcement machine learning structure is likely, thus increasing utility by refining the weights within the complexity of input vectors. The input vector functions as a set of descriptive statistics (such as, but not limited to mean complexity 1004, standard deviation connectivity 1006, as shown in FIG. 10) on the known data by Complexity and Connectivity as well as a vectorized form of the Concept (the concepts in FIG. 10 being "Kubernetes"[0799330903] and "Natural Language Processing" [7926388745]).

This a neural network 400 is enabled to estimate complexity and connectivity for Concepts (e.g., Skills) based on the vectorization, and resulting Euclidean distance calculations, of the concepts within the vector space.

Figure 11:
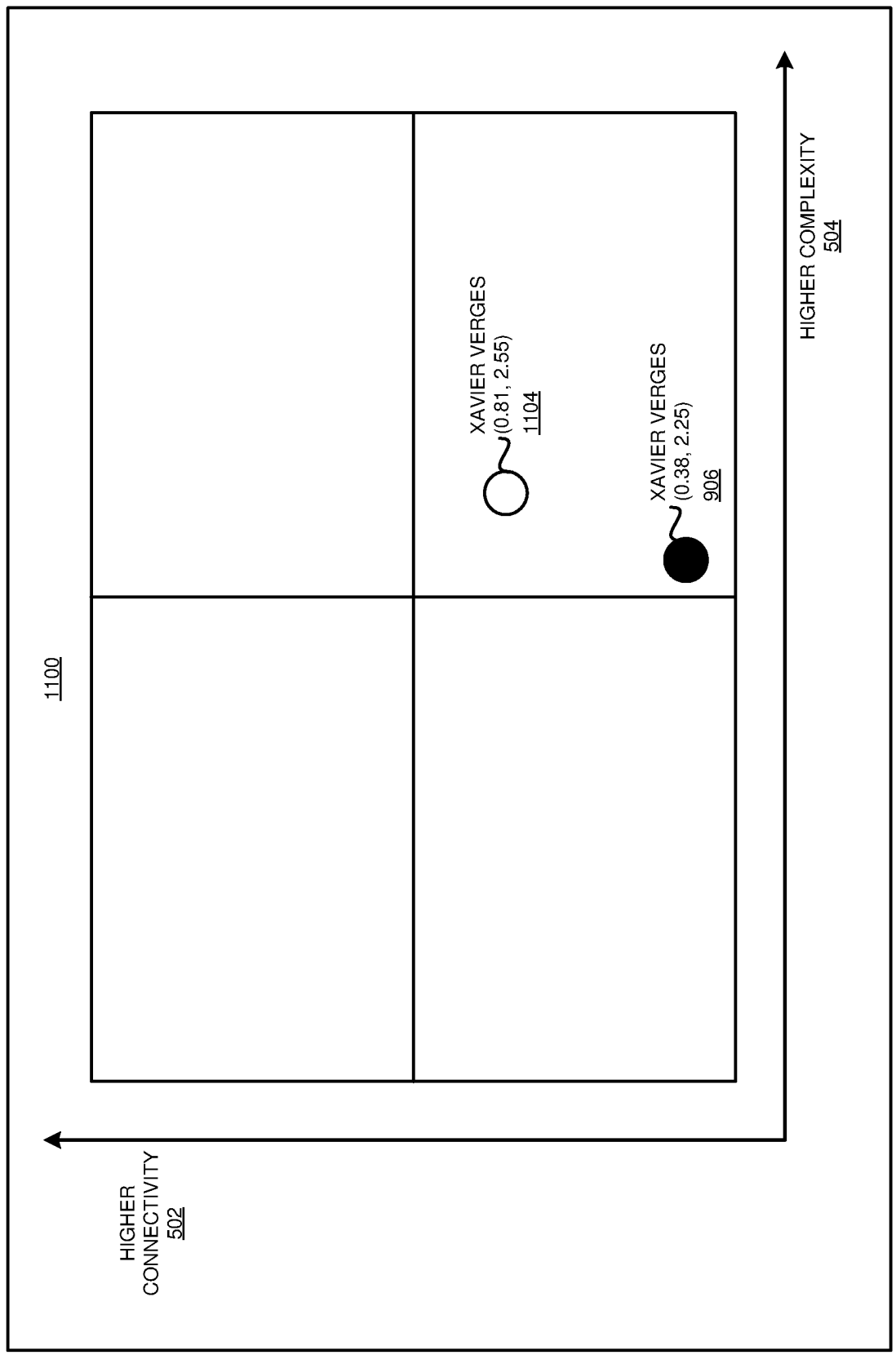
FIG. 11 illustrates a visualization in which illustrative embodiments may be implemented.

FIG. 11 shows another exemplary embodiment in which the system 300 can be adjusted to predict how a replacement may perform (based on similar skills and work history within other asset repositories 308) or how an existing individual will perform given a similar technology. Herein, the system performs a prediction 1104 for OpenShift4, for example, for Xavier within the team. As other team members (with a higher mean for connectivity) also have OpenShift experience, the system 300 predicts more support for Xavier (who also has a high mean for connectivity implying he is receptive to support). Likewise, Xavier has past experience with the technology, so the system predicts a relatively high complexity and connectivity score for this technology. This becomes a useful prediction for the individual, as it allows the possibility for demonstrating which technologies and teams can best lead to an exercise of thought leadership. It's great to have deep expertise, but a receptive team is necessary for the exercise of thought leadership.

Figure 12:
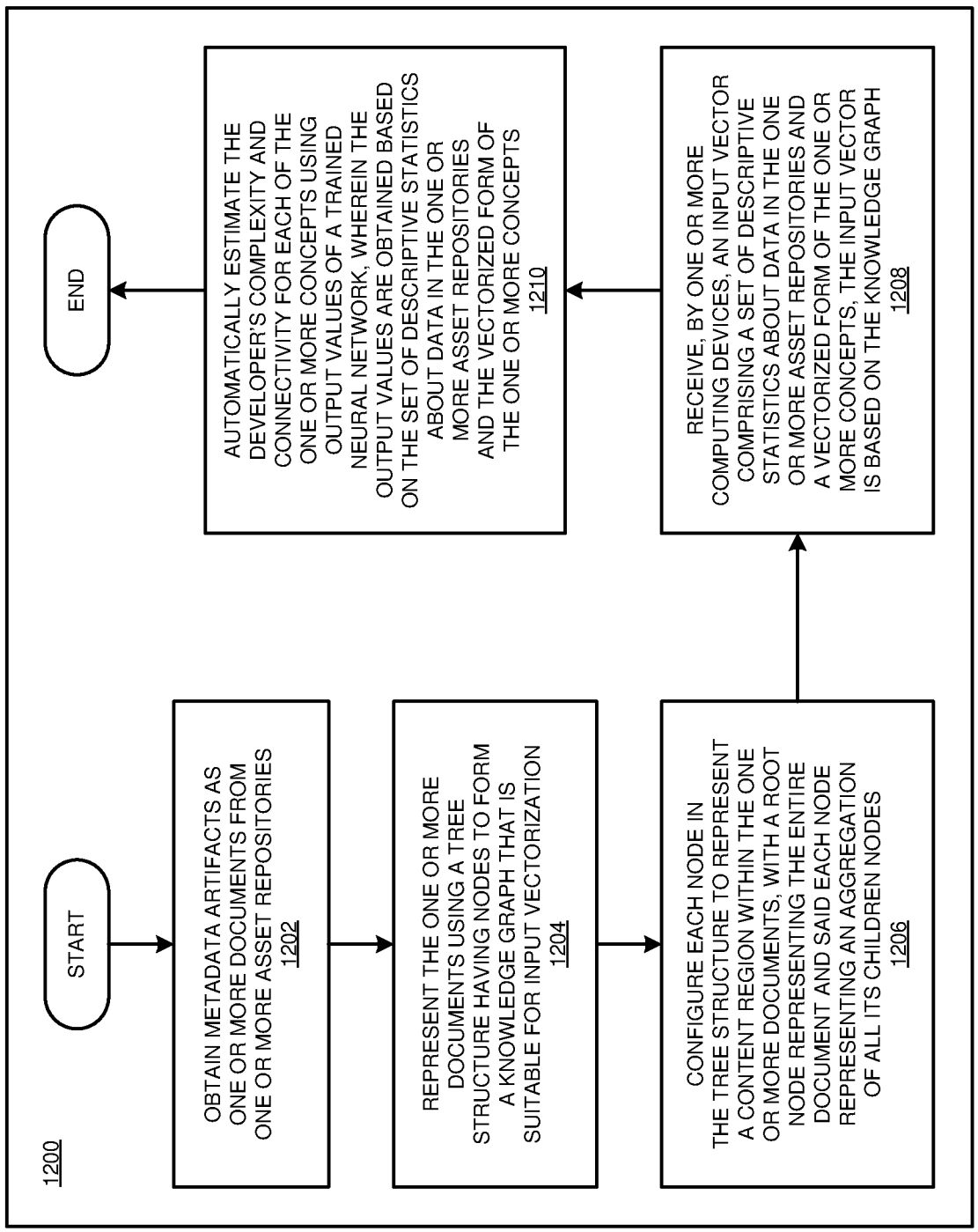
FIG. 12 illustrates a process for analyzing one or more asset repositories to in accordance with one embodiment.

Turning now to FIG. 12, a process 1200 for analyzing workplace churn and replacement will be described. In step 1202, process 1200 obtains metadata artifacts as one or more documents from one or more asset repositories. In step 1204, process 1200 represents the one or more documents using a tree structure having nodes to form a knowledge graph that is suitable for input vectorization. In step 1206, process 1200 configures each node in the tree structure to represent a content region within the one or more documents, with a root node representing the entire document and said each node representing an aggregation of all its children nodes. In step 1208, process 1200 receives, by one or more computing devices, an input vector comprising a set of descriptive statistics about data in the one or more asset repositories and a vectorized form of the one or more concepts, the input vector being based on the knowledge graph. In step 1210, process 1200 automatically estimates the developer's complexity and connectivity for each of the one or more concepts using output values of a trained neural network, wherein the output values are obtained based on the set of descriptive statistics about data in the one or more asset repositories and the vectorized form of the one or more concepts.

Thus, a computer implemented method, system or apparatus, and computer program product are provided in the illustrative embodiments for analyzing workplace churn and replacement and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for analyzing one or more asset repositories to determine a developer's complexity and connectivity for each of one or more concepts, the method comprising:
training a neural network to output an estimate of complexity based on a relationship between descriptive statistics and a set of skill complexity data, and to output an estimate of connectivity based on a relationship between the descriptive statistics and a set of collaborative ability data, wherein the descriptive statistics include descriptive statistics about data in one or more asset repositories, and wherein the training of the neural network results in a trained neural network;
obtaining metadata artifacts as one or more documents from one or more asset repositories;
representing the one or more documents using a tree structure having nodes to form a knowledge graph that is suitable for input vectorization;
configuring each node in the tree structure to represent a content region within the one or more documents, with a root node representing the entire document and said each node representing an aggregation of all its children nodes;
receiving, by one or more computing devices, an input vector comprising a set of descriptive statistics about data in the one or more asset repositories and a vectorized form of the one or more concepts, said input vector being based on the knowledge graph, and
automatically estimating said developer's complexity and connectivity for each of the one or more concepts using output values of the trained neural network, wherein the output values are obtained based on the set of descriptive statistics about data in the one or more asset repositories and the vectorized form of the one or more concepts.

2. The method of claim 1, wherein the developer's complexity and connectivity for each of the one or more concepts are estimated based on resulting Euclidean distance calculations, of the one or more concepts within the vector space.

3. The method of claim 1, wherein the metadata artifacts include commits, issues, pull requests and file changes.

4. The method of claim 1, further comprising obtaining triples of nodes from the tree structure, to form positional information for sequentializing the nodes of the tree structure from left to right, wherein the triples of nodes include a root node and neighboring sibling nodes.

5. The method of claim 4, wherein the triples of nodes include a user node, a skill node or a semantic delegation construct.

6. The method of claim 1, wherein the one or more concepts includes an extracted role, skill or activity in the one or more asset repositories.

7. The method of claim 1, further comprising obtaining quads of nodes from the tree structure to form positional information for sequentializing the nodes of the tree structure from left to right.

8. A computer usable program product comprising one or more computer-readable storage devices, and program instructions stored on at least one of the one or more storage devices, the stored program instructions comprising:
program instructions to train a neural network to output an estimate of complexity based on a relationship between descriptive statistics and a set of skill complexity data, and to output an estimate of connectivity based on a relationship between the descriptive statistics and a set of collaborative ability data, wherein the descriptive statistics include descriptive statistics about data in one or more asset repositories, and wherein the training of the neural network results in a trained neural network;
program instructions to obtain metadata artifacts as one or more documents from one or more asset repositories;
program instructions to represent the one or more documents using a tree structure having nodes to form a knowledge graph that is suitable for input vectorization;
program instructions to configure each node in the tree structure to represent a content region within the one or more documents, with a root node representing the entire document and said each node representing an aggregation of all its children nodes;
program instructions to receive, by one or more computing devices, an input vector comprising a set of descriptive statistics about data in the one or more asset repositories and a vectorized form of one or more concepts, said input vector being based on the knowledge graph, and
program instructions to automatically estimate said developer's complexity and connectivity for each of the one or more concepts using output values of the trained neural network, wherein the output values are obtained based on the set of descriptive statistics about data in the one or more asset repositories and the vectorized form of the one or more concepts.

9. The computer usable program product of claim 8, wherein the developer's complexity and connectivity for each of the one or more concepts are estimated based on resulting Euclidean distance calculations, of the one or more concepts within the vector space.

10. The computer usable program product of claim 8, wherein the metadata artifacts include commits, issues, pull requests and file changes.

11. The computer usable program product of claim 8, wherein the instructions further configure the computer to obtain triples of nodes from the tree structure, to form positional information for sequentializing the nodes of the tree structure from left to right, wherein the triples of nodes include a root node and neighboring sibling nodes.

12. The computer usable program product of claim 11, wherein the triples of nodes include a user node, a skill node or a semantic delegation construct.

13. The computer usable program product of claim 8, wherein the one or more concepts includes an extracted role, skill or activity in the one or more asset repositories.

14. A computer system comprising one or more processors, one or more compute-readable memories, and one or more computer-readable storage devices, and program instructions stored on at least one of the one or more storage devices for execution by at least one of the one or more processors via at least one of the one or more memories, the stored program instructions comprising:
program instructions to train a neural network to output an estimate of complexity based on a relationship between descriptive statistics and a set of skill complexity data, and to output an estimate of connectivity based on a relationship between the descriptive statistics and a set of collaborative ability data, wherein the descriptive statistics include descriptive statistics about data in one or more asset repositories, and wherein the training of the neural network results in a trained neural network;

program instructions to obtain metadata artifacts as one or more documents from one or more asset repositories;

program instructions to represent the one or more documents using a tree structure having nodes to form a knowledge graph that is suitable for input vectorization;

program instructions to configure each node in the tree structure to represent a content region within the one or more documents, with a root node representing the entire document and said each node representing an aggregation of all its children nodes;

program instructions to receive, by one or more computing devices, an input vector comprising a set of descriptive statistics about data in the one or more asset repositories and a vectorized form of one or more concepts, said input vector being based on the knowledge graph, and program instructions to automatically estimate said developer's complexity and connectivity for each of the one or more concepts using output values of the trained neural network, wherein the output values are obtained based on the set of descriptive statistics about data in the one or more asset repositories and the vectorized form of the one or more concepts.

15. The computer system of claim 14, wherein the developer's complexity and connectivity for each of the one or more concepts are estimated based on resulting Euclidean distance calculations, of the one or more concepts within the vector space.

16. The computer system of claim 14, wherein the metadata artifacts include commits, issues, pull requests and file changes.

17. The computer system of claim 14, wherein the instructions further configure the computer to obtain triples of nodes from the tree structure, to form positional information for sequentializing the nodes of the tree structure from left to right, wherein the triples of nodes include a root node and neighboring sibling nodes.

18. The computer system of claim 17, wherein the triples of nodes include a user node, a skill node or a semantic delegation construct.

19. The computer system of claim 14, wherein the one or more concepts includes an extracted role, skill or activity in the one or more asset repositories.

20. The computer system of claim 14, wherein the instructions further configure the computer to obtain quads of nodes from the tree structure to form positional information for sequentializing the nodes of the tree structure from left to right.

* * * * *